United States Patent Office 2,990,579
Patented July 4, 1961

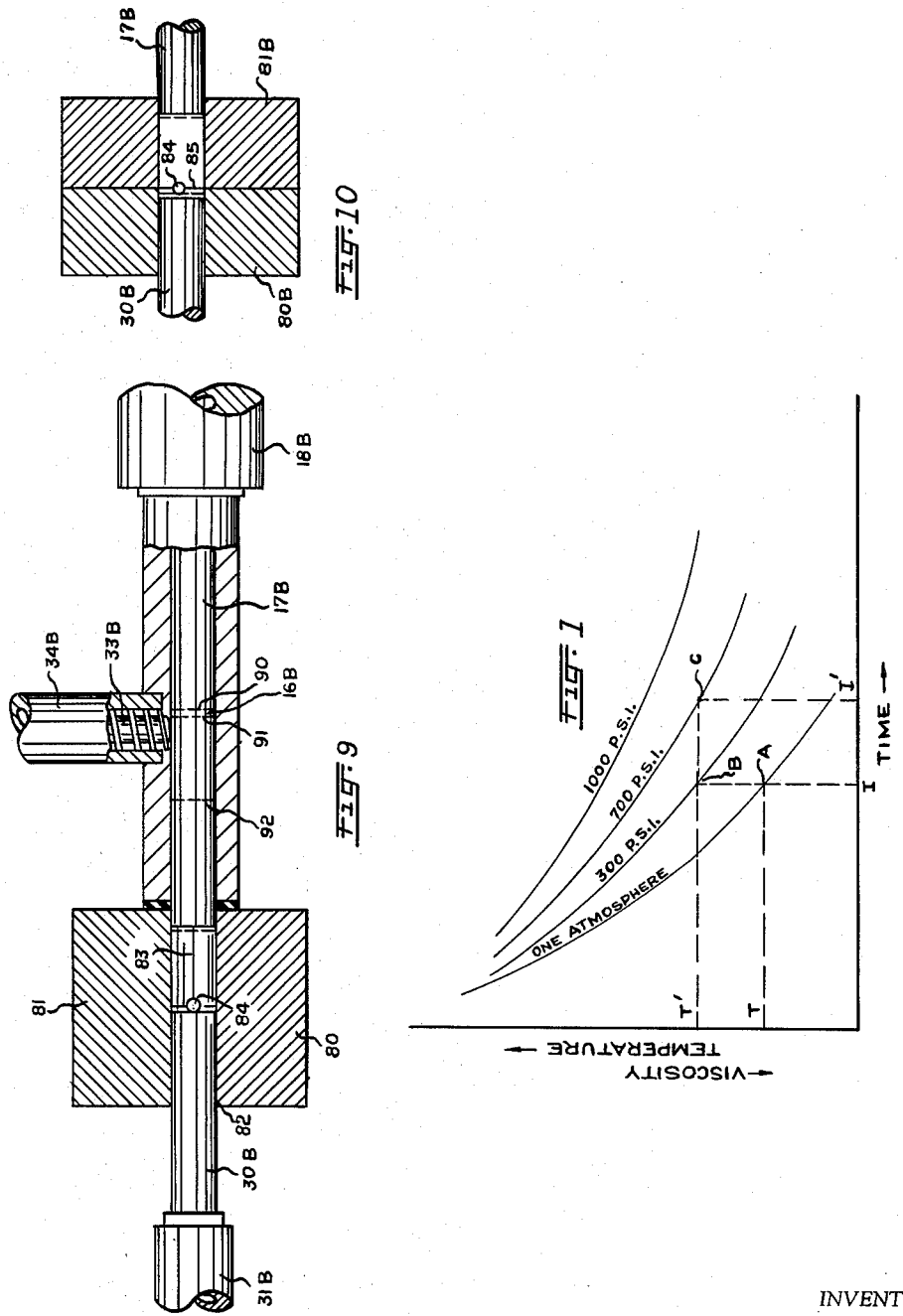

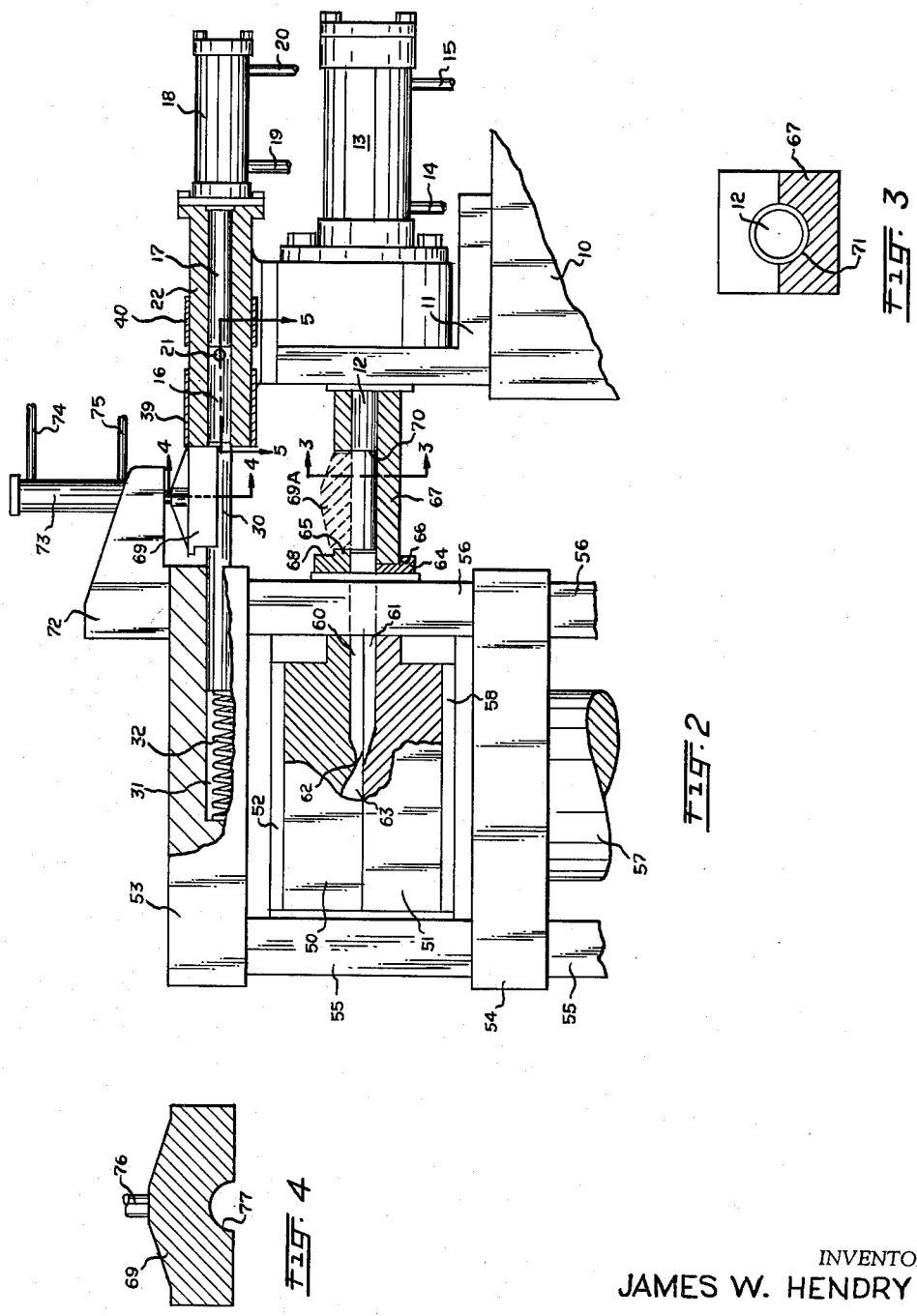

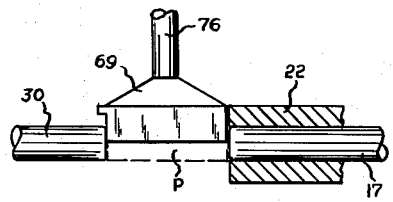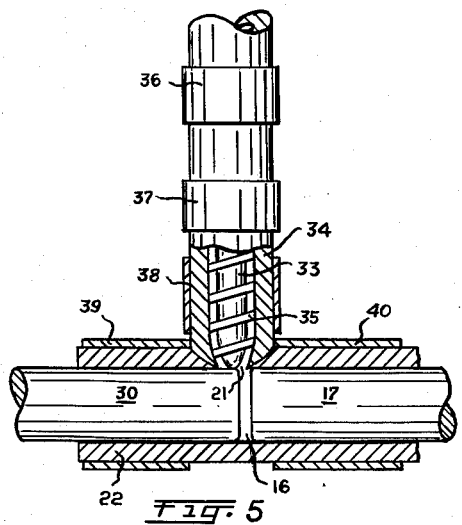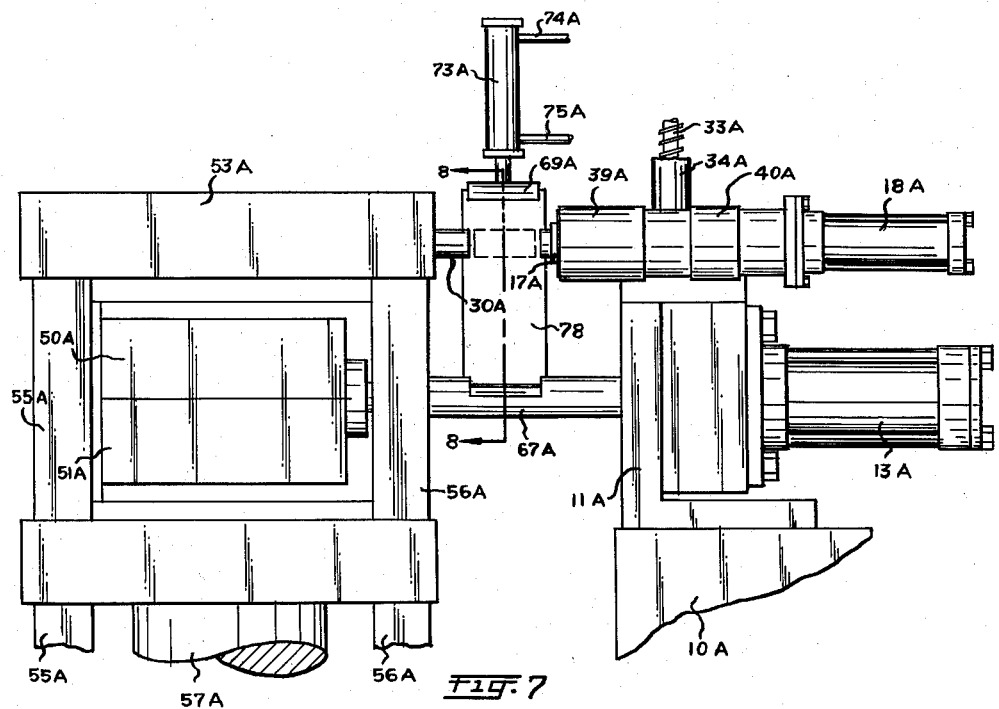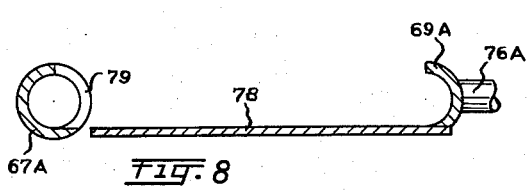
INVENTOR
JAMES W. HENDRY
BY W. E. Sherwood
ATTORNEY

2,990,579
METHOD AND APPARATUS FOR MOLDING HEAT SENSITIVE PLASTIC MATERIALS
James W. Hendry, Louisville, Ky., assignor to Tube Turns Plastics, Inc., Louisville, Ky., a corporation of Delaware
Filed Nov. 26, 1957, Ser. No. 698,988
10 Claims. (Cl. 18—30)

The present invention relates to the molding of organic plastic materials, and more particularly to improvements in method and apparatus for the injection molding of such materials by virtue of which the temperature and viscosity of, and the pressure imposed upon, the plastic material are properly controlled and coordinated during each of the several phases of preparation for molding as well as during the final injection molding stage, to the end that the molding operation may be simplified and made more economical, the molding time cyle may be shortened and plastic articles of improved characteristics may be produced.

This application is a continuation-in-part of my copending application, Serial No. 337,982, filed February 19, 1953.

Although the invention may be employed to advantage in the molding of plastics, either thermoplastic or thermosetting, which have presented no particular problems when molded by present day conventional techniques, it is particularly adapted for and advantageous in the handling of heat sensitive plastics which are characterized by obstinate molding behavior. Such plastic materials are found to possess, in varying degrees, one or more of the properties of a critical and narrow working temperature range, a low thermal conductivity, and a high minimum viscosity even when heated to the relatively high working temperature range. An outstanding example of such material is unplasticized polyvinyl chloride, sometimes referred to as "rigid PVC" or "hard PVC". This material has been recognized as having notable advantages for many commercial applications, but its usage has been retarded by numerous problems difficult to overcome in the molding of articles of satisfactory high quality. The method and apparatus of the present invention are especially designed to solve those problems. Hence, because of the importance of unplasticized polyvinyl chloride in relation to the invention, and for purposes of conveying the fullest understanding of the details and advantages of the invention, the ensuing discussions and detailed description will be in terms of that material and its characteristics. It is to be understood, however, that this is not to be taken as indicating that the invention is limited in application to this single exemplary material. On the contrary, the invention is intended to include the molding of any and all plastic materials for which the herein described method and apparatus are suitable since, as previously pointed out, the invention may be employed to advantage in the molding of other difficult heat sensitive plastics as well as plastics which present no particular problems when molded by conventional techniques.

In order to avoid confusion as to the meaning of certain terminology herein employed, it may be well to point out that the term "unplasticized polyvinyl chloride" is intended to mean a plastic material which comprises polyvinyl chloride and the chemical and physical (including molding) properties of which are primarily controlled by the polyvinyl chloride, and which material is rigid or substantially rigid in its finished state and either contains no plasticizer or contains plasticizer in such small amount that the ability to resist chemical attack and the physical properties of a finished product made therefrom are not materially different from those of a finished product made from a plastic which is free of plasticizer but otherwise identical.

On the other hand, the terms "plasticizing" and "preplasticizing" are intended to mean the physical processing, by heating or mechanical working, or both, of a plastic material to reduce its viscosity and otherwise mechanically condition the material for molding, and those terms are not intended to signify the adding of a plasticizer.

Examples of unplasticized polyvinyl chloride materials for the molding of which the present invention is especially adapted and advantageous are "Exon" 401 and "Exon" 402A, manufactured and sold by Firestone Tire and Rubber Company, Akron, Ohio and "Geon" 8700 and "Geon" 8704, manufactured and sold by Goodrich Chemical Company, Akron, Ohio. Basically, such plastic compounds comprise:

(a) pure polyvinyl chloride resin;
(b) a stabilizer, such as lead oxide, tin or barium-cadmium;
(c) a lubricant, such as carnauba wax; and
(d) a coloring pigment, if desired.

Such plastic compounds as well as other unplasticized polyvinyl chloride molding materials generally are characterized by having a low thermal conductivity; a very narrow and critical working temperature range, generally from about 360° to about 390° F., and preferably from about 375° to about 390° F., and a high minimum viscosity, comparable to that of putty, even when heated to that working range. As a result of these characteristics, the molding of unplasticized polyvinyl chloride presents some formidable problems. In order to effect the molding operation most efficiently and economically and to produce finished articles of satisfactory quality, it is highly important that all parts of a given molding charge be brought uniformly to the desired temperature and molding viscosity. The low thermal conductivity of unplasticized polyvinyl chloride makes this difficult of attainment since, unless the heating of the material is accomplished in a proper and carefully controlled manner, some increments of a molding charge may reach temperatures above the safe working limit while other increments, not being able to share the heat of the hotter increments, may not reach a temperature within the working range. If the material is not heated at least to the working temperature range, its viscosity may be so great that it is unmoldable with any practically employable equipment. On the other hand, if the material is heated to a temperature beyond the upper limit of the critical working range, it will be subject to undesirable and even destructive changes, such as degradation and gassing due to volatilization of stabilizer and decomposition of the material with the giving off of hydrogen chloride gas. This may result in inferior or entirely unsatifactory finished products and may even occur to such extent as to cause dangerous explosions in the molding equipment. The foregoing emphasizes the importance of using great care and accuracy in controlling the temperature and viscosity of unplasticized polyvinyl chloride at all stages in the molding cycle.

With regard particularly to the viscosity of unplasticized polyvinyl chloride, it has been observed that when the material is at a temperature at or near the lower end of the working temperature range, it has a viscosity somewhat like that of stiff putty as it comes out of a can, or cold unworked taffy. For the molding of material having such high viscosity, heavy pressures, necessitating the use of large and expensive molding machines, are required in order properly to form the finished molded articles. Even with such equipment, the production of articles of satisfactory quality requires a high order of operational skill. A lowering of the viscosity obviously would reduce the equipment requirements and also facilitate the production of higher quality products.

Such lowering of the viscosity may be accomplished by raising the temperature of the molding material to a point at or near the upper limit of the working temperature range, since the viscosity of unplasticized polyvinyl chloride is inversely related to temperature, at least within the working range. However, the viscosity also is importantly influenced by the manner in which the plastic is heated up to and within the working temperature range. If the heat is applied while the material is in a quiescent state, and particularly if the heat is supplied from an external source (i.e., one which effects heating of a body of the material from the outside inwardly), the reduction in viscosity may be relatively small. On the other hand, if the material is subjected to mechanical working concurrently with the external heating, the material will attain at or near the upper end of the working temperature range a viscosity somewhat like that of putty as it is being worked in the hands preparatory to using it for glazing, or taffy just after it has been worked (i.e., stringy, capable of being pulled out—a column of it would not stand up but would tend to sag). Such mechanical working not only supplements the external heat source, due to the generation of frictional heat within the body of material, but also serves to accomplish the desired uniformity of temperature and viscosity throughout the material.

Various means, such as torpedos, breaker plates and screws, have been employed for effecting heating and working of various plastic materials in preparation for extrusion or injection molding thereof. However, with torpedos, breaker plates, restricted orifices and like devices, proper control of the extent and uniformity of heating and working is difficult and even impossible to accomplish when working with unplasticized polyvinyl chloride, due to its extremely critical and narrow working temperature range. With such devices, it is practically impossible to prevent at least some increments of a molding charge of unplasticized polyvinyl chloride from exceeding the safe temperature limit while other increments may not even attain the working temperature range. I have found that the most effective, and in most cases the only, kind of device for properly conditioning unplasticized polyvinyl chloride for injection molding is a heater-worker preplasticizer of the kind employing external heater means in conjunction with a conveying and working screw of proper design.

Various forms of injection molding apparatus employing such screw-type heater-worker preplasticizers are disclosed in my Patents Nos. 2,705,342 and 2,705,343 which are assigned to the assignee of the present invention and were copending with the application of which the present application is a continuation-in-part. Apparatus of this kind has been for a number of years in successful commercial operation in the production of injection molded unplasticized polyvinyl chloride products of exceptionally good quality. In the operation of such apparatus, however, certain practical operating difficulties have been encountered and it has been necessary to resort to certain compromises which have tended to impose limitations on attainment of the desired sizes or the ultimate in quality characteristics of articles produced, particularly where the specifications for articles for special or critical applications have been extremely exacting. It has been recognized that articles of higher density, higher tensile strength and improved strain-free characteristics could be produced if the unplasticized polyvinyl chloride could consistently be handled and injected while having a lowered viscoisty, such as hereinbefore described, corresponding to that attainable in the upper region of the working temperature range. This, however, has been difficult, and often impossible, to attain with apparatus such as referred to above.

This difficulty is due in large part to the fact that the previously described degradation and gassing tendency of unplasticized polyvinyl chloride is dependent upon a time-temperature relationship. There is the ever-present danger, even when the material is below the upper safe limit of the working temperature range, that such degradation may occur if the material is permitted to reside in a hot condition at atmospheric pressure for too long a period of time. The tendency toward degradation and gassing increases with increase in temperature. Even though the degradation may not progress to a degree that would result in an inherently dangerous condition in the molding equipment, nevertheless it may be sufficient to result in reduced tensile strength, low density or poor surface characteristics of the finished article.

With apparatus of the kind above referred to, the material to be molded is heated and worked in the preplasticizer until it attains a temperature within the working range and a corresponding moldable viscosity, such condition preferably being attained at or near the discharge end of the preplasticizer, and a quantity of the preplasticized material is delivered into the injection cylinder. When a predetermined measured charge is accumulated in the cylinder, the operation of the preplasticizer screw is discontinued and the injection ram is advanced to inject the charge into the mold. Then, after a predetermined period required for solidification of the molded part, the ram is withdrawn, the preplasticizer screw again is caused to operate to condition additional material in the preplasticizer, and the molding cycle is repeated. The accumulation of a charge in the injection cylinder requires more or less time, depending upon the size of the charge. In some instances, if the quantity of material in a molding charge is relatively small so that the period required for accumulation of the charge at atmospheric pressure in the injection cylinder is very short, it is possible to heat the material to a temperature near the upper end of the working range and thereby obtain the benefit of the reduced viscosity without danger of degradation and gassing to an intolerable degree. However, there always is the danger that due to malfunctioning of the apparatus, inattention of an operator or other cause, the accumulation period may be extended to such degree that undesirable degradation and gassing of the charge in the injection chamber may take place even with a small charge. When the molded article is of such size as to require a relatively large volume of material to constitute the charge, it is practically impossible to accumulate the charge in the injection chamber in a period of time sufficiently short to insure against undesirable degradation of the material. Hence, it usually is necessary to resort to the compromise of heating the material in the preplasticizer to some temperature within the working range, perhaps even at or near the lower end of that range, which is sufficiently low to insure against degradation of the material in the injection cylinder during the time required for accumulation of a charge in the cylinder. This, of course, results in the molding charges having to be injected at a higher viscosity, i.e., at or near the stiff putty-like condition hereinbefore referred to, which necessitates the employment of very high injection pressures and therefore large and expensive equipment. Even so, in some instances it may be impossible to produce articles of the desired high density, high tensile strength and strain-free characteristics with equipment practically available, especially if the articles are of relatively large size.

Another problem encountered with apparatus of the kind above referred to is that of controlling the amount of mechanical working of the material in the preplasticizer. As previously indicated, the frictional heat produced by such working contributes to the heating up of the material so as thereby to reduce the viscosity. Also, as is the case with thixotropic materials, the mechanical working in and of itself has a beneficial effect in reducing the viscosity. It therefore is desirable to subject the material to be molded to a relatively vigorous working action, as may readily be accomplished with a screw type preplasticizer of proper design. However, great care must be exercised to insure against the generation of an excess amount of frictional heat such as might raise the temperature of the material in the preplasticizer beyond the safe upper limit of the working range. In the case of a material having such a critical and narrow temperature range as unplasticized polyvinyl chloride, this presents a real problem. Various expedients for the dissipation of such excess heat have been resorted to, but they involve difficulties in effecting proper control and coordination with the external heat source usually employed with heater-worker preplasticizers and none has proved entirely satisfactory, especially in the molding of unplasticized polyvinyl chloride. Alternatively, it has been necessary to reduce the amount of working below that which otherwise would be desirable to attain the maximum beneficial reduction in viscosity.

The difficulties and limitations above referred to have contributed to limiting the full utilization of unplasticized polyvinyl chloride for injection molding of many kinds of articles for which the inherent properties of that plastic are otherwise well suited. It, therefore, is an important object of the present invention to overcome the disadvantages inherent in the methods and apparatus heretofore employed and to eliminate the necessity for the compromise procedures which it heretofore has been necessary to resort to in the molding of heat sensitive plastic materials such as unplasticized polyvinyl chloride.

More particularly, an object of the present invention is to provide an improved method and apparatus by means of which such heat sensitive materials may be injection molded to form articles which not only are strain-free but also have higher density and higher tensile strength than heretofore obtainable with such materials.

A further object is to provide an injection molding apparatus of improved design such that it may be of relatively small size and simple and economical construction, yet capable of producing, from heat sensitive plastic materials, articles comprised of larger volumes of material than it has been practically possible to injection mold in the past.

Another object is the provision of an injection molding apparatus, for the molding of heat sensitive plastic materials, which has a faster and more efficient cycle of operation than conventional injection molding apparatus.

A still further object is the provision of an improved method and apparatus for injection molding of unplasticized polyvinyl chloride which make possible the maintenance of very exact control over the temperature and viscosity of the material throughout the molding cycle, from the heating of the raw material to the final molding, and minimize or entirely eliminate undesirable degradation and gassing of the material.

The novel features which I believe to be characteristic of my invention are set forth with particularity in the appended claims. My invention itself, however, both as to its organization and method of operation, may be best understood by reference to the following description taken in conjunction with the accompanying drawings in which:

FIG. 1 is a chart showing the general relationship of time available for handling of a prepared plastic material as related to its temperature and viscosity and the pressure under which it is maintained.

FIG. 2 is a side elevation, partly in section, of a first form of apparatus suitable for carrying out the method of the invention and showing the accumulation chamber in filled condition.

FIG. 3 is a sectional view through the ram chamber taken on line 3—3 of FIG. 2.

FIG. 4 is a partial sectional view taken on line 4—4 of FIG. 2 and showing the ram chamber cover in charge ejecting position.

FIG. 5 is a sectional view taken on line 5—5 of FIG. 2 and with the accumulation chamber at the beginning of the filling operation.

FIG. 6 is a fragmentary view showing the accumulation chamber of FIG. 2 at the conclusion of a charge ejection operation.

FIG. 7 is a plan view of an apparatus, similar to FIG. 2, but arranged horizontally rather than vertically, and showing a modified means for transferring the plastic charge from the accumulation chamber to the ram chamber.

FIG. 8 is a sectional view taken on line 8—8 of FIG. 7.

FIG. 9 is a fragmentary view of a second form of apparatus suitable for carrying out the method of the invention and showing the ram chamber as part of the mold; and FIG. 10 is a partial view of an apparatus similar to that of FIG. 9, but with a mold parting line arranged normal to the axis of the accumulation and ram chambers.

An important feature of the present invention is that once the raw material to be molded is brought to the desired temperature and moldable viscosity within the critical working range, that temperature and viscosity thereafter are maintained substantially unaltered through the subsequent phases of the molding operation and the material is subjected to relatively high pressure throughout the whole or substantially the whole of the period from the time the material reaches the desired temperature and viscosity until the molding operation is completed. More particularly, in accordance with the invention the material to be molded is heated and preplasticized to the desired uniform temperature and moldable viscosity, within the critical range, in a first or preplasticizer stage wherein the material is subjected to pressure of the order hereinafter specified at least as soon as the material attains such temperature and viscosity; a measured charge of the material next is transferred into and accumulated in a second or accumulation stage without material alteration in the temperature or viscosity and while the material continues to be subjected to the high pressure; and finally the accumulated charge is transferred to a third or injection stage, where it is subjected to high pressure and the temperature and viscosity are maintained substantially unaltered from the temperature and viscosity established in the first stage, and the charge is immediately discharged in its entirety into the mold. The transfer from the first to the second stage preferably is accomplished by the pressure generated in the preplasticizer, which pressure continues to be applied to the material in the accumulator stage. The transfer from the second to the third stage may be accomplished in various ways, as by gravity or mechanical means as hereinafter described. It is important, however, that this latter transfer be accomplished quickly and in such manner that the pressure either is maintained on the charge throughout the transfer or is released for only a very short time, a matter of a few seconds.

In FIG. 1, there is shown a chart depicting in a simplified manner the general relationship, as applying more particularly to unplasticized polyvinyl chloride, between the viscosity and the temperature acquired by the material in the preplasticizing stage and the time available thereafter for transferring and discharging the preplasticized material into the mold before undesirable degradation or gassing of the material will occur, all as affected by the pressure conditions to which the material is subjected in the course of its transfer from the preplasticizing stage to and into the mold. The arrows in FIG. 1 signify directions of increase in the values of temperature, viscosity and time, respectively. Due to the hereinbefore outlined difficulties and limitations encountered in the operation of the previous apparatus, wherein a molding charge is accumulated in the injection chamber under atmospheric pressure and a substantial period of time may elapse before the entire charge is accumulated and can be injected, it has been the usual practice to heat the material only to a temperature at or near the lower end of the working temperature range in order to insure against undesirable degradation and evolution of gases. Such a temperature is represented by the line T in FIG. 1, while I represents the time afforded to accumulate a charge and move it into the mold without undesirable degradation and gassing when the material is under atmospheric pressure as represented by the point A in FIG. 1. However, as previously explained, when the temperature of the material is at or near the lower end of the working range, as represented by line T, the material has the relatively higher viscosity as previously described. Molding of the material in this stiff condition therefore requires relatively high injection pressure, necessitating the employment of large and expensive molding equipment. Even with such equipment, it may be impossible under some conditions and with some molding compounds to produce articles having the ultimate in tensile strength, density and strain-free characteristics.

In contrast with the above-described operation using point A at atmospheric pressure, the molding operation may be carried on more easily and simply and with less costly equipment, and articles of improved quality may be obtained, if the material after attaining the desired temperature and molding viscosity in the preplasticizer stage is maintained under elevated pressure such as, for example, 300 pounds per square inch as represented by the point B in FIG. 1. Under such circumstances, and even with the same allowable time interval I for moving the material into the mold, it is possible to heat the material to a higher temperature, such as that represented by the line T' in FIG. 1 and which generally represents a temperature within but near the top of the critical working temperature range. As a result of the higher temperature, it is made possible to work with the lower and improved viscosity as hereinbefore explained. The advantages attendant upon working at a point such as B on the chart of FIG. 1 include the use of lower injection pressure with concomitant lighter and less expensive molding equipment; an improved filling of the mold cavity, since the plastic moves more readily at its relatively lower viscosity; a greater density and tensile strength of the molded article; and less likelihood of built-in stresses in the molded article.

It is to be understood that the pressure is not necessarily 300 pounds per square inch, but may be any value of pressure sufficient to prevent degradation and gassing under the particular conditions of the desired operation, including the desired temperature and viscosity of the material and the time required for transfer of preplasticized material from the preplasticitizer phase into the mold. From a practical standpoint, the pressure will be largely determined by the pressure producing capabilities of the preplasticizer unit, which capabilities usually will be entirely adequate with preplasticizers of the kind customarily employed. For purposes of example and further discussion below of some of the aspects of the invention, there are included in FIG. 1 two additional curves generally representing operation at 700 and 1,000 pounds per square inch, although pressures below, intermediate or above these may be employed.

As an alternative to the operation at point B described above, and if circumstances should arise wherein the time interval I would prove to be insufficient for the accumulation and further handling of a charge of the desired volume, as for example a charge for a relatively massive part, a higher pressure, such as 700 pounds per square inch as indicated at the point C on FIG. 1, may be employed. This would permit operation at the elevated temperature T', with the attendant advantages due to the corresponding lower viscosity, while affording an extended period of time, as indicated at I', for accumulation of a charge of material and transferring it into the mold.

With unplasticized polyvinyl chloride, the working temperature range, corresponding somewhat to the difference between T and T' in FIG. 1, may be no more than about 15° F. However, even with other heat sensitive plastic materials which may not have so narrow a working range, operation in accordance with the present invention may be equally advantageous where simplification and speed-up of the molding operation, without danger of scorching, decomposition, degradation or gassing, are important.

As seen in FIG. 2, one form of apparatus suitable for carrying out the method of the invention may include a stationary base 10 having a rigid pedestal 11 supported thereby and provided with an aperture through which a reciprocable injection ram 12 extends. Mounted on one side of the pedestal is an injection ram actuating cylinder 13 having a piston therein connected to the ram and supplied with a pressure fluid through conduits 14 and 15 controlled by any conventional control means, not shown, for the purpose of actuating the ram at the desired time.

Rigidly mounted upon the pedestal is a suitable housing incorporating a plastic accumulating chamber 16 forming an important part of the invention and comprising an expansible pressure chamber functioning to accomplish the second, or accumulating, phase of the method of the invention. Extending inwardly of this chamber from one end thereof is a reciprocable discharging ram 17 connected to a piston, not shown, in an actuating cylinder 18. This cylinder, in turn, is supplied with a pressure fluid through conduits 19 and 20 controlled by any conventional control means, not shown, for the purpose of actuating the discharging ram at the desired time. As seen in FIG. 2, discharging ram 17 is occupying its fully retracted position, the face of the ram being disposed closely adjacent an inlet port 21 in the cylindrical wall 22 and through which preplasticized material is forced under pressure into the expansible accumulating chamber 16.

Cooperating with the discharging ram 17 and extending into the other end of the accumulation chamber 16 is an elongated, pressure responsive, plastic-compacting ram 30 slidably mounted at its outer end in a cylinder 31 provided in the upper portion of the mold frame, later to be described. Retracting movement of this ram 30 is opposed by any suitable means in the cylinder 31, preferably as by a regulated pressure fluid or alternatively for use at lower pressures by a compression spring 32, as shown, the backing pressure upon the ram 30 serving to oppose the pressure of the plastic material entering the accumulation chamber 16 through inlet port 21.

Extending laterally from the accumulating chamber, as seen in FIG. 5, is a suitable preplasticizing unit, which may be of the type shown in my aforesaid Patents Nos. 2,705,342 and 2,705,343. From that preplasticizing unit, plastic material at the desired temperature and viscosity is discharged under pressure through inlet port 21 into the expansible accumulation chamber 16. This unit functions to provide the first or preplasticizing phase of the method of the invention.

The preplasticizing unit in general includes a screw 33 rotatable in tube 34 and provided with a plurality of flights 35. The preplasticizing unit is fed raw plastic from any convenient source, such as a hopper, not shown, and the raw material is agitated by screw 33 and forced in the direction of the open end of the tube 34. During its movement, it is controllably supplied with external heat by a series of heaters as shown at 36, 37 and 38. This external heat is supplemented by the frictional heat developed by the screw within the plastic material, so that the combined effect is to raise the temperature of the material to the selected value within the working temperature range, as for example, value T' in FIG. 1. As the plastic mass is worked and mixed under pressure by the flights of the screw, it rapidly develops frictional heat, the amount of which may be readily controlled by regulating the speed of that screw. The amount of mechanical heat developed will also be related in a given case to the construction of the screw. It therefore is important to employ a screw of such construction and to control the speed of operation thereof, in accordance with principles known to those skilled in the art and discussed in my previously identified patents, so as to cause the material to be brought to the final desired uniform temperature and viscosity by the time it reaches the discharge end of the preplasticizer unit, whereby it is necessary only to maintain that temperature and viscosity constant, or substantially so, throughout the subsequent phases of the molding operation. Moreover, the pressure imposed upon the material in the preplasticizer unit also is related to the construction of the screw, so that it is important to employ a screw capable of imposing upon the material at least at the discharge end of the preplasticizer pressures of the order hereinbefore specified. However, the screws customarily employed in preplasticizers of the kind herein described generally have such capability. Thus, by means of the exercise of conventional controls provided for the screw and external heaters, a particular point on the selected pressure curve of FIG. 1, within the narrow working temperature range and corresponding to an optimum viscosity, temperature and pressure condition of the plastic, can be accurately chosen by the operator.

Any suitable means may be provided for maintaining the plastic, while being accumulated in chamber 16, at substantially the same temperature it possesses upon leaving the preplasticizing apparatus. The direct connection between that chamber and the tube 34 assists in this objective. In addition, heating bands 39 and 40 may be provided around the wall 22 of the accumulation chamber for supplying, if necessary, a sufficient amount of heat thereto during the accumulating of a charge of preplasticized material therein to avoid cooling of the material while being held under pressure therein.

As seen in FIG. 5, the face of discharging ram 17 is disposed closely adjacent the inlet port 21 during the charge accumulating operation and provides a rigid abutment against which the incoming plastic is directed. At the beginning of the accumulating phase of each molding cycle, the confronting face of the compacting ram 30 may, if desired, be arranged to almost contact the face of ram 17, leaving a small crack therebetween into which the material fed by the screw 33 finds its way and begins to push against the movable ram 30. In such a case, a minimum of air is confined in the expansible chamber 16 at the beginning of the accumulating stage. Generally, however, it is satisfactory to arrange the faces of rams 17 and 30 adjacent the inlet port 21, as shown in FIG. 5, and the small amount of air confined therebetween is forced outwardly along the slight clearance between ram 30 and the cylinder wall 22 as the plastic fills the space.

This slight clearance also serves a useful purpose in connection with the handling of the plastic under the elevated pressures being used, since the heated plastic serves a self sealing purpose around retractible ram 30 and discharging ram 17, thus eliminating the need for piston rings on these rams. Upon movement of discharging ram 17, as now to be described, the small amount of this material in contact with the cylinder wall is, however, stripped from that cylinder wall and the chamber 16 is completely cleaned for reuse in the next succeeding cycle of molding.

As the plastic enters the expansible chamber, it gradually forces the compacting ram 30 to the left as shown in FIG. 2, due to the pressure developed by the preplasticizer unit, until a charge of predetermined size, in the form of a cylinder P (FIG. 6) is accumulated. The opposing force provided by the compacting ram 30 serves to maintain the material in chamber 16 under constant pressure corresponding to that developed by the preplasticizer unit. By the utilization of suitable control means (not shown but which are conventional), the compacting ram may be made to stop at the proper point when the predetermined charge of material is accumulated in chamber 16, thus serving a measuring function. When such charge is accumulated, both the discharge ram 17 and the compacting ram 30 are caused to move simultaneously and at equal rates of speed leftwardly until they occupy the respective positions shown in FIG. 6. The movement of the rams to the left and the necessarily concurrent termination of rotation of screw 33 mayy all be effected by the same control which may either be a timing device based on the time the screw has been in operation, or, preferably, by a limit switch, responsible to the leftward movement of the compacting ram 30. Such control means are well known to the industry and need not be detailed herein.

Reference now is made to the portions of the apparatus of FIG. 2 functioning to perform the third, or injection, phase of the method of the invention. As shown therein, a conventional two-part mold having an upper portion 50 and a coacting lower portion 51, may be conveniently mounted for movement of the lower portion toward and from the stationary upper mold portion. The upper portion 50, for example, may be rigidly attached to an upper plate 52 supported in turn by the upper member 53 of a stationary mold frame. The upper member 53 of the frame may conveniently provide the cylinder 31 in which the movable compacting ram 30 is housed, and may be affixed to stationary suitably anchored posts, two of the posts being shown at 55 and 56. The mold frame is, of course, rigidly fixed with respect to the path of movement of injection ram 12. Adapted for travel along the posts 55 and 56 is a lower member 54 attached to a downwardly extending plunger 57 of a hydraulic cylinder and with a supporting platen 58 interposed between the lower mold portion 51 and the lower member 54. The particular embodiment of the mold actuation, however, forms no novel part of the present invention and any other conventional means for providing a mold cavity and for actuating the mold parts may be employed without departing from the broader aspects of the present teaching.

Within the two mold portions 50 and 51 there are provided semi-cylindrical openings 60 and 61 whose axes coincide and lie within the plane of the parting line of these mold portions. These semi-cylindrical openings cooperate to form a cylindrical outward opening confronting the end of the injection ram 12, and at their inner ends narrow to form a gate 62 leading directly into mold cavity 63.

A mold fixture 64 having on opening 65 therethrough aligned with the injection ram 12 and of a diameter equal to the cylindrical outward opening 60, 61, in the mold portions is suitably attached to the mold supporting structure. This fixture is horizontally divided with its lower portion fastened for movement with the lower mold-portion 51 and its upper portion fastened in fixed relation to the upper mold portion 50. The fixture has a recess 66 on its lower portion receiving the end of the trough 67 and a guide member 68 on its upper portion engaging a suitable recess in the cover 69, which trough and cover will later be described.

A complementary fixture comprising a member rigidly attached at one end to the pedestal 11 and with an internal cylindrical opening 70 therein receiving the injection ram 12 serves to bridge the space between pedestal 11 and the fixture 64. This complementary fixture includes an open trough section 67 having an upwardly facing semi-cylindrical opening 71 (FIG. 3) whose inner wall is a continuation of the wall of the lower half of opening 70, as well as a continuation of the lower half of the opening 65 in fixture 64, and is adapted for reception of the charge P of plastic material after its discharge from the accumulation chamber 16, the distance between the edge of cylindrical opening 70 in the one fixture and the edge of opening 65 in the other fixture preferably being slightly larger than the length of the maximum size of a cylindrical charge P that would be produced by the accumulating mechanism. Of course, smaller sized charge may in some cases, be utilized.

Mounted upon the stationary upper member 53 of the mold frame is a bracket 72 serving as support for a vertically mounted cover-actuating means comprising a pressure cylinder 73 to which a pressure fluid may be supplied in a controlled manner through conduits 74 and 75. Extending from the piston in this cylinder is a piston rod 76 attached at its lower end to cover 69 as seen in FIG. 4. This cover has a semi-cylindrical recess 77 in the lower side thereof which is complementary to the opening 71 in the trough 67, thus to form a complete cylindrical chamber when the respective parts are brought together. This displacement of the piston in cylinder 73 is such as to cause the parts 67, 69, to abut against each other at the termination of the downward movement of the piston rod as indicated by the dotted position 69A of the cover as seen in FIG. 2.

With the foregoing description of one form of apparatus in mind, the operation of the apparatus may be conducted as follows. The raw plastic material having been preplasticized in the described manner, in the first, or preplasticizing phase, and having been accumulated as a charge P in the second, or accumulation phase, is then moved rapidly out of the accumulation chamber by simultaneous leftward actuation of ram 17 and ram 30 as previously described. Until this occurs, the material has continuously been maintained under an elevated pressure in the two preceding phases, is at a uniform temperature within the critical range and has the desired improved and uniform moldable viscosity. Immediately upon discharge from the accumulation chamber, the hot charge of material, as seen in FIG. 6, is disposed beneath and in contact with cover 69 and between the confronting ends of rams 30 and 17. At this time, the pressure exerted upon the charge as a result of its previous confinement in the accumulation chamber is relieved, but this relief is only momentary, amounting to no more than a few seconds. Immediately upon the positioning of the charge beneath cover 69, the cylinder 73 is then actuated to move the cover downwardly, carrying the charge therewith. Alternately, the charge P may fall instantly by gravity into trough 67 disposed a short distance therebelow or may be carried to that trough by movement of the cover 69. In either event, the charge is promptly deposited in trough 67 and cover 69 promptly coacts with the trough to form a closed cylinder within which pressure may immediately be re-established upon the hot charge of plastic. As soon as cover 69 reaches its cylinder-completing position, as seen in dotted lines in FIG. 2, cylinder 13 promptly actuates injection ram 12, whereupon pressure is again established upon the charge and is maintained during the third, or injection, phase of the molding operation.

Upon entry of ram 12 into fixture 64, cylinder 73 may be promptly actuated to retract the cover to its ready position and cylinder 18 may be promptly actuated to retract ram 17 to its initial position shown in FIG. 5. Also, the preplasticizing screw 33, which had temporarily stopped rotation during the transfer of a charge from the accumulation stage to the injector stage, may again be caused to rotate. The compacting ram 30 is caused by any suitable means, simultaneously to follow ram 17 to the initial position shown in FIG. 5. Various practical advantages result from the sequence of operations just described. The preplasticizing screw does not have to wait upon completion of the injection step before beginning its next cycle of operation. Thus, it is enabled to operate almost continuously and charges can be dropped for injection into a mold fully as rapidly as plastic material in the mold can be rigidified, the molded parts removed, the injection ram 12 withdrawn, and the mold again closed. This materially decreases the overall time of the molding cycle of operation of the apparatus and further, since the preplasticizing unit is enabled to operate substantially continuously, it is possible to use a somewhat smaller screw and smaller driving apparatus therefor than would be possible if the screw had to operate for shorter periods of time at a higher rate of speed. Further, the less violent operation of the screw obtained, in the type of machine herein disclosed, makes it possible to maintain a more even temperature distribution within the plastic material worked thereby than would be possible if, in order to secure a desirably rapid molding cycle from the entire apparatus, it were required to plasticize the plastic material and to drive it out of the preplasticizing unit at a high rate of speed.

Moreover, should it be desirable to prevent the plastic charge from cooling even the slight amount which might otherwise occur in the arrangement set forth above, it will be possible to enclose in a heat retaining housing the zone bounded at one end by the cover 69 in its upper position of FIG. 2 and bounded at its other end by the trough 67. Due to the short period of time elapsing during the transfer of the charge from the second to third stages of treatment, the viscosity of the charge is not materially altered. Furthermore, the very small interval during which the charge is at atmospheric pressure is insufficient to permit any substantial gasification or degradation of the material.

As a further advantage, the discharge of the plastic in the third, or injection stage at a lower and improved viscosity, attributable to the use of pressure as described and to the higher temperature of preplasticizing which this invention makes possible, results in the use of smaller molding pressures and less massive molding frame and ram structures.

Other forms of apparatus may also be employed in carrying out the improved method. For example, as shown in FIG. 7, apparatus similar to that in FIG. 2 and having similar parts indicated by similar references using the suffix "A" may be employed, it being understood that the base 10A, frame rods 55A, 56A, plunger 57A and movable mold portion 51A are horizontally disposed rather than vertically disposed. In this modification, the trough 67A cooperates with a cover member 69A movable across a stationary table 78 bridging the space between the point at which the charge is discharged from the accumulation chamber and the open side of that trough. The cover 69A has a suitable contour to close the opening 79 in the trough 67A and thereby to form that trough into a closed cylinder. The operation of this apparatus is the same as that previously described except that no gravity transfer of the heated charge is employed, its transfer being under a positive pushing by the piston rod 76A. Since this piston rod may be actuated quickly by cylinder 73A, a rapid transfer operation is insured.

Another, and simpler, form of apparatus for carrying out the method of the invention is depicted in FIG. 9, the essential portions of the apparatus employed in the first, second and third stages of treatment being shown, and with similar parts using similar references indicated by the suffix "B," it being understood that the remainder of the complete structure may be of conventional form. As shown, a preplasticizing apparatus having a tube 34B and a screw 33B similar to the apparatus of FIG. 5, discharges into chamber 16B in which operates a ram 17B actuated by a pressure fluid controllably supplied to cylinder 18B. An oppositely positioned compacting ram 30B is reciprocably mounted in the chamber 16B coaxially with ram 17B and is driven to the right, as shown, by a pressure fluid controllably supplied to cylinder 31B. The movement of the compacting ram 30B to the left, however, is effected in two stages, the first of which is caused by the pressure of plastic material accumulating in chamber 16B and the second of which is caused by movement of ram 17B.

The chamber 16B is suitably joined to a mold structure 80, 81, having a cylindrical opening 82 therein through which the compacting ram 30B is adapted to reciprocate. This opening passes all the way through the mold and may be positioned parallel with and diametrically divided by the mold parting line 83, as seen in FIG. 9, or may be positioned perpendicularly to the mold parting line 85 when an equivalent mold structure 80B, 81B, shown in FIG. 10, is employed. In both forms of the molds, a gate 84 leads from the cylindrical opening in the mold to the usual mold cavities, not shown.

This form of apparatus, in which the plastic material is constantly under pressure in the first, second and third stages of treatment, operates as follows: With the face of ram 17B retracted to a point indicated by dotted lines at 90 and with the face of compacting ram 30B advanced to a point indicated by dotted lines at 91, the chamber 16B begins to fill with preplasticized material forced outwardly from tube 34B under pressure by screw 33B. As this chamber fills, ram 17B remains stationary but compacting ram 30B is forced leftwardly by the pressure of the incoming material, its leftward movement, however, being sufficiently resisted by the medium contained in cylinder 31B to continuously apply a compacting force upon the plastic material. When the compacting ram has been moved sufficiently far to the left, as indicated at dotted line 92 and corresponding to the accumulation of a charge of desired size, the preplasticizing screw 33B, is stopped and both rams are moved simultaneously leftward into the mold by actuation of pressure cylinder 18B. At this time, compacting ram 30B reaches a position beyond gate 84 and thereafter remains stationary and acts as a part of the mold, while ram 17B continues to move leftwardly and to force the plastic material from the charge through the gate 84 into the mold cavities, thus completing the third or injection stage of treatment upon the material. When the plastic material has set sufficiently and no longer requires pressure to be held upon it from ram 17B, both rams then move an additional distance to the left so that ram 17B may project from opening 82, thus to discharge any film or fragments of material remaining in opening 82. Upon or before the reassembling of the mold, the rams may then be returned to positions 90 and 91 for commencement of a new cycle. It will be understood that the stopping and starting of the preplasticizing screw and the actuation of the respective rams by their respective cylinders may be controlled by any conventional means, for example, by limit switches responsive to the positions occupied by compacting ram 30B. Various known control devices for actuation of the several cooperating elements of the apparatus described in the foregoing specification may be used as desired and are illustrated for example in my aforementioned Patents 2,705,342; and 2,705,343.

In accordance with the improved method herein taught, formerly difficult-to-use plastics, such as rigid polyvinyl chloride, may be processed in an improved manner for forming articles of improved characteristics. As one example, pipe fittings made of rigid polyvinyl chloride plastic and adapted to handle corrosive materials and be subjected to high bursting pressures, may conveniently be made in accordance with the teachings hereof.

In accordance with the patent statutes, I have described what at present are considered to be the preferred embodiments of my invention, both as to method and apparatus, but it will be obvious to those skilled in the art that various changes and modifications may be made therein without departing from the true spirit and scope of the invention and I, therefore, aim to cover, in the appended claims, all such equivalent variations and modifications.

What is claimed is:

1. In a plastic molding machine the combination comprising: preplasticizing means for converting raw plastic material into a condition for molding; an accumulation chamber receiving said plastic material from said preplasticizing means; a ram for driving a charge of predetermined quantity out of said accumulation chamber; a semi-cylindrical trough opening toward said accumulation chamber and positioned parallel with and below the discharge end of said accumulation chamber; a vertically reciprocable cover closing said trough and cooperating therewith to define a cylindrical chamber; a mold having a cavity therein and an opening connecting with said cavity and being of the same radius as said trough and having its walls constituting a continuation of said cylindrical chamber; and a ram in said trough for driving plastic material from said trough into said last-named opening and thence into said cavity.

2. The construction of claim 1 wherein said cover moves between a position adjacent said accumulation chamber on the side thereof remote from said trough and a position closing said trough and cooperating therewith to define a cylindrical chamber.

3. In an injection machine for molding heat and pressure sensitive plastic materials, such as unplasticized polyvinyl chloride; the combination comprising: a housing defining an accumulation chamber with openings at opposite ends and an inlet port through the sidewall thereof, said port having a cross-sectional area not materially in excess of the cross-sectional area of said accumulation chamber and one of said openings being an outlet for material accumulated in said accumulation chamber; means defining a preplasticizing chamber communicating at one end thereof with said accumulation chamber through said port; a first ram extending through the end of said accumulation chamber opposite said outlet opening thereof, said first ram being movable past said port toward and away from said outlet opening; a second ram substantially coaxial with said first ram and extendable reciprocably into and through said outlet opening; means yieldably urging said second ram through said outlet opening and toward said port, said port communicating with said accumulation chamber when said first ram is retracted; screw means in said preplasticizing chamber for progressively plasticizing and positively urging successive increments of said material under a substantial pressure through said port until a plasticized charge accumulates in said accumulation chamber, said second ram yielding to the pressure developed by said accumulation of said charge in response to the urging of said screw and moving away from said port as said charge accumulates while maintaining a pressure on said charge; means causing said first ram to move said charge and said second ram through said outlet opening; and means for displacing said charge from between said rams, whereby said charge can be thereafter placed in a mold and conformed to the shape thereof.

4. In a plastic molding machine, the combination comprising: a preplasticizing housing having a preplasticizing chamber therein, an entrance into said chamber and an outlet from said chamber and means within said chamber and between said entrance and said outlet for simultaneously plasticizing, working, and heating plastic material therein and for subjecting said material to a substantial first pressure in the region of said outlet; an accumulator housing having an accumulation chamber therein and an inlet port communicating with said preplasticizing chamber outlet; a first power actuated ram arranged within said accumulator housing and movable toward and away from said inlet port of said accumulation chamber; a second ram arranged in said accumulation housing and movable toward and away from said inlet port of said accumulation chamber, said rams being substantially coaxial with each other and movable toward and away from each other; said accumulation chamber inlet being in atmosphere-excluding communication with the outlet from said preplasticizing chamber and said accumulator housing being so arranged that when said rams are positioned adjacent each other and in position to confine material moving into said accumulation chamber from said inlet port at the beginning of an accumulation cycle, the portion of said accumulation chamber between said rams will be prevented from contact with the atmosphere; yieldable means operative to urge said second ram with a first pressure toward said first ram, and controllable power means for urging said first ram toward said second ram, said power means being of sufficient capacity to impose an opposed second pressure on said second ram, said second pressure being sufficient to overcome said yieldable means and thereby to move the entire accumulated body of plastic material between said rams as a charge out of said accumulation chamber, and control means effecting a pressure on said first ram less than said first pressure while said charge is being formed and effecting said second pressure on said first ram after said charge is formed.

5. A method for molding plastic materials having the molding behavior of unplasticized polyvinyl chloride, including the steps: simultaneously kneading, masticating, mechanically working and heating a quantity of material to reduce its viscosity to a uniform level suitable for molding and applying a pressure thereto; successively transferring portions of said quantity under continuing pressure through an unobstructed passageway to a substantially closed accumulation chamber without subjecting said portions to any treatment which would materially effect their viscosity; accumulating said portions in said accumulation chamber while minimizng contact between said portions and the ambient atmosphere and maintaining the viscosity thereof substantially constant and the pressure applied thereto substantially undiminished, until a charge of plasticized material is present whereby said charge constitutes a compact and homogeneous billet of measured volume; transferring the entire quantity of said charge to an injection chamber while maintaining the viscosity of said charge substantially unchanged, said transferring taking place during an interval of time sufficiently small to avoid, during said transferring, any substantial gasification, degradation, and change in viscosity of said material derived from its pressure environment; injecting the entire quantity of said charge into a mold; rigidifying said charge; and removing said charge from said mold.

6. A method for molding plastic materials having the molding behavior of unplasticized polyvinyl chloride, including the steps: plasticizing a quantity of material with a plasticizing screw and external heat to reduce its viscosity to a uniform level suitable for molding and simultaneously applying a pressure thereto; transferring successive portions of said quantity under a substantially constant pressure through an unobstructed passageway to a substantially closed accumulation chamber having a pair of opposed rams at least one of which is urged toward the other; said transferring effecting a movement of said portions into said chamber and a forcing of said rams apart, said portions being held under a steady pressure by said rams while maintaining the viscosity of said portions at substantially the same level, accumulating said portions in said accumulation chamber while substantially preventing contact thereof with the ambient atmosphere and maintaining the viscosity thereof at substantially the same level, and holding the pressure thereon substantially undiminished, until a charge of plasticized material is present therein whereby said charge constitutes a compact and homogeneous billet of measured volume; then transferring the entire quantity of said charge to an injection chamber while maintaining the viscosity of said charge substantially unchanged, said transferring taking place during an interval of time sufficiently small to avoid, during said transferring, any substantial gasification, degradation, and change in viscosity of said material derived from its pressure environment; injecting the entire quantity of said charge into a mold; rigidifying said charge; and removing said charge from said mold.

7. In a method for molding natural and synthetic organic plastic materials having the molding behavior of unplasticized polyvinyl chloride, the steps including: simultaneously heating and agitating under pressure in a first phase of treatment a quantity of said material to render it to a constant viscosity suitable for molding, supplying said material under pressure from the first phase into an accumulation chamber of variable capacity, applying a resisting pressure to the material in said chamber to maintain the pressure thereon substantially constant and to compact the material delivered thereto and to form a compact billet of uniform viscosity and measured volume as a second phase of treatment, intermittently and rapidly transferring the entire amount of material accumulated in said chamber to an injection chamber, said transferring taking place during an interval of time sufficiently small to avoid, during said transferring, any substantial gasification, degradation, and change in viscosity of said material derived from its pressure environment, placing the entire amount of said transferred material under an injection pressure as a third phase of treatment, and injecting the entire amount of said material into a mold.

8. The method of claim 7 wherein said pressure upon said material is maintained during the transfer from said second to said third phase of treatment.

9. The method of molding heat sensitive plastic materials, such as unplasticized polyvinyl chloride, including, preplasticizing the material under superatmospheric pressure and bringing it to a substantially uniform viscosity condition suitable for molding, depositing the preplasticized material in a confined expansible pressure chamber and retaining the substantially uniform viscosity condition of the entire charge in said chamber during the filling thereof by simultaneously maintaining said superatmospheric pressure thereon, promptly transferring the entire amount of the accumulated charge of material from said chamber upon completion of the filling thereof to an injection chamber, and promptly injecting the entire amount of the transferred charge from said injection chamber, said transferring taking place during an interval of time sufficiently small to avoid, during said transferring, any substantial gasification, degradation, and change in viscosity of said material derived from its pressure environment under pressure into a mold prior to substantial change in viscosity thereof, rigidifying said charge in said mold, and removing the molded article from said mold.

10. In a plastic molding apparatus, the combination comprising: preplasticizing means for converting raw plastic material into a condition for molding, said condition comprising a heated material under pressure having a substantially uniform and relatively low viscosity, an accumulation chamber of variable capacity receiving material from said preplasticizing means and having a discharge opening at one end, a discharging ram mounted for reciprocation in said chamber, a compacting ram mounted for reciprocation in said chamber and confronting said discharging ram, means for applying a resisting pressure to said compacting ram thereby to permit gradual retraction thereof during the filling of said chamber and to maintain a pressure on said material suitable for retention of said molding condition thereof while residing in said chamber, means for rapidly moving said discharging ram in the direction of the discharge end of said chamber following accumulation of a measured charge of material in said chamber thereby to force said compacting ram and the entire quantity of accumulated charge disposed between said rams outwardly of said chamber, and means for molding said charge following its discharge from said accumulation chamber.

References Cited in the file of this patent

UNITED STATES PATENTS

| | | |
|---|---|---|
| 2,359,840 | Goessling | Oct. 10, 1944 |
| 2,477,258 | MacMillin | July 26, 1949 |
| 2,705,342 | Hendry | Apr. 5, 1955 |
| 2,705,835 | Massmann | Apr. 12, 1955 |
| 2,737,686 | Harkenrider | Mar. 13, 1956 |